C. W. LOVELACE.
POWER ATTACHMENT FOR MOTOR CARS.
APPLICATION FILED JUNE 27, 1917.
1,278,178.
Patented Sept. 10, 1918.
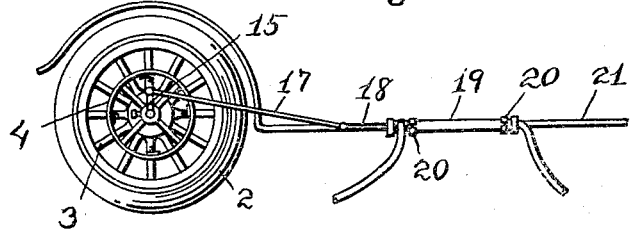
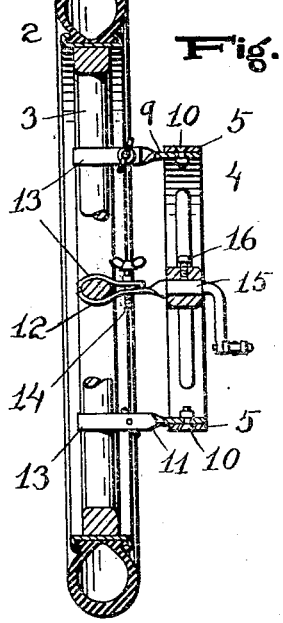
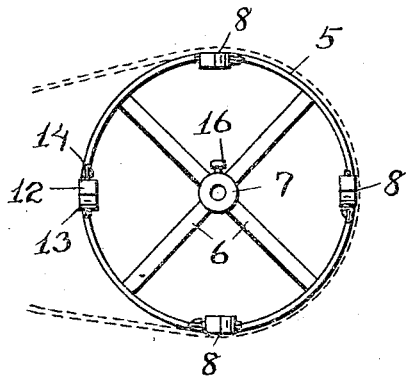
Inventor:
Charles W. Lovelace
by E.W. Anderson
his Attorneys

UNITED STATES PATENT OFFICE.

CHARLES W. LOVELACE, OF SHELBURN, INDIANA.

POWER ATTACHMENT FOR MOTOR-CARS.

1,278,178.

Specification of Letters Patent.   Patented Sept. 10, 1918.

Application filed June 27, 1917.   Serial No. 177,310.

*To all whom it may concern:*

Be it known that I, CHARLES W. LOVELACE, a citizen of the United States, resident of Shelburn, in the county of Sullivan and State of Indiana, have made a certain new and useful Invention in Power Attachment for Motor-Cars; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1 is a side view of the invention as applied.

Fig. 2 is a central vertical section of the same.

Fig. 3 is a side view of the wheel portion of the invention.

The invention has relation to power attachments for automobiles, and it consists in the novel construction and combinations of parts, as hereinafter set forth.

In the accompanying drawings, illustrating the invention, the numeral 2 designates the wheel of an automobile, usually one of the rear wheels, 3 the spokes thereof and 4 the attachment the latter in the form of a wheel having a circumferential rim 5, radial spokes 6 and a hollow hub 7.

This attachment is applied to the wheel by means of clamps 8, composed each of a main member having a shank 9 projecting laterally of and bolted at one end at 10 in contact with the inner circumferential surface of the pulley rim, twisted angularly at 11, intermediately of its length and having at its opposite end a spoke-engaging jaw 12; auxiliary members 13, having also each a spoke-engaging jaw, and clamp bolts 14 connecting the members adjacent to the jaws thereof and located upon the outer side of the wheel 2.

Usually, a crank shaft 15 will be fitted within the hub of the attachment and secured therein by a set screw 16, a connecting rod 17 having operating connection with said shaft and with the piston rod 18 of a pump 19, said pump clamped at 20 to the running board 21 of the car.

The attachment may be used as a belt wheel by making the rim of sufficient breadth.

The invention serves a useful purpose, and will operate a pump to wash the motor car or to spray trees, will operate a churn or small machinery, etc., taking the place generally of a small gasolene engine. An effective stroke of seven or eight inches is readily obtained. In use, the car is jacked up in rear, at one side, and the attachment secured in place.

I claim:

1. The combination with a motor car wheel having spokes, of a pulley having an annular rim, and clamps projecting laterally of and connected each at one end thereof to the rim of the pulley and provided at their opposite ends with spoke-engaging jaws and clamp bolts.

2. The combination with a motor car wheel having spokes, of a pulley having an annular rim, and clamps composed each of a main member provided with a shank projecting laterally of and secured at one end in contact with the inner surface of said rim, twisted angularly and having at its opposite end a spoke-engaging jaw, auxiliary members having each a spoke-engaging jaw, and bolts connecting the members adjacent to the jaws thereof and located upon the other side of said wheel.

In testimony whereof I affix my signature in presence of two witnesses.

C. W. LOVELACE.

Witnesses:
E. H. NICHOLSON,
JAMES W. PAYNE.

Copies of this patent may be obtained for five cents each, by addressing the "Commissioner of Patents, Washington, D. C."